United States Patent [19]

Arai

[11] 4,389,935
[45] Jun. 28, 1983

[54] METHOD AND APPARATUS FOR CONTROLLING A PRINTER

[75] Inventor: Kiyoshi Arai, Higashikurume, Japan

[73] Assignee: Sony Corporation, Tokyo, Japan

[21] Appl. No.: 317,055

[22] Filed: Nov. 2, 1981

[30] Foreign Application Priority Data

Nov. 5, 1980 [JP] Japan .................. 55-155541

[51] Int. Cl.³ .............................. B41J 7/92; B41J 7/70
[52] U.S. Cl. ............................. 101/93.01; 101/93.03; 346/76 PH; 400/157.3; 400/166; 400/120
[58] Field of Search ............... 101/93.01, 93.03, 93.04, 101/93.05; 346/76 PH; 400/157.3, 166, 120

[56] References Cited

U.S. PATENT DOCUMENTS

| | | | |
|---|---|---|---|
| 3,934,695 | 1/1976 | Kovalick | 400/120 |
| 4,071,849 | 1/1978 | Koyano et al. | 346/76 PH X |
| 4,162,131 | 7/1979 | Carson et al. | 101/93.03 |
| 4,168,421 | 9/1979 | Ito | 346/76 PH X |
| 4,205,359 | 5/1980 | Shortridge | 346/76 PH |
| 4,219,824 | 8/1980 | Asai | 346/76 PH |
| 4,268,838 | 5/1981 | Nakano et al. | 400/120 X |
| 4,280,404 | 7/1981 | Barrus et al. | 101/93.03 |

FOREIGN PATENT DOCUMENTS 1287165 8/1972 United Kingdom .

OTHER PUBLICATIONS

Barron et al., IBM Tech. Discl. Bulletin, vol. 19, No. 8, Jan., 1977, pp. 3107–3108.

Primary Examiner—Edward M. Coven
Attorney, Agent, or Firm—Alvin Sinderbrand; Lewis H. Eslinger

[57] ABSTRACT

A method and apparatus for controlling a printer of the type having plural print heads, each being selectively energizable to print an indicium whose relative intensity is determined by the duration of energization of that printer. Data representing the intensity of the indicia to be printed by each of the print heads is received and stored. Respective ones of the print heads are selectively energized over time durations determined by the data. The number of print heads which are energized is detected, and the duration that the respective print heads are energized is varied as a function of the number of print heads which are concurrently energized.

13 Claims, 7 Drawing Figures

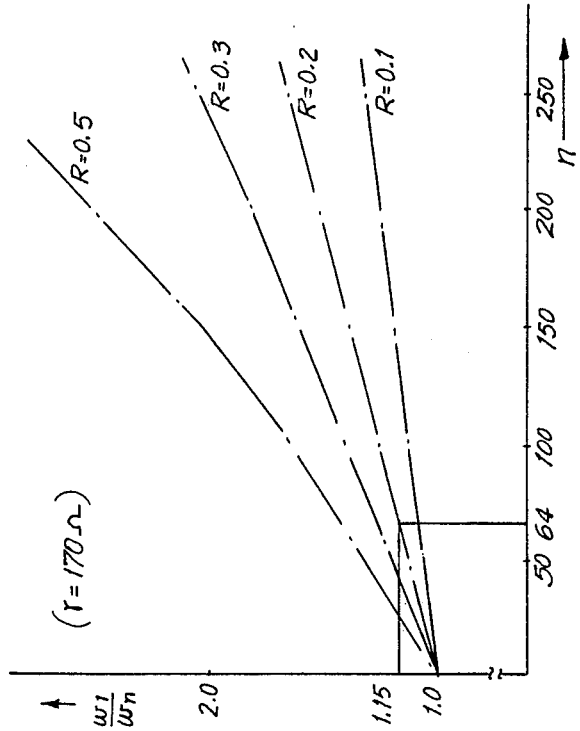
FIG. 4
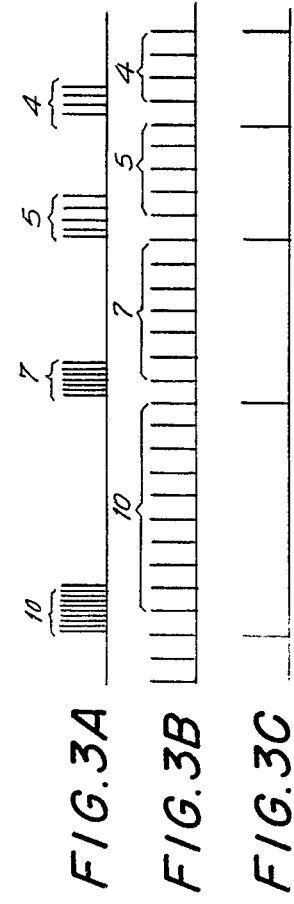
FIG. 3A
FIG. 3B
FIG. 3C
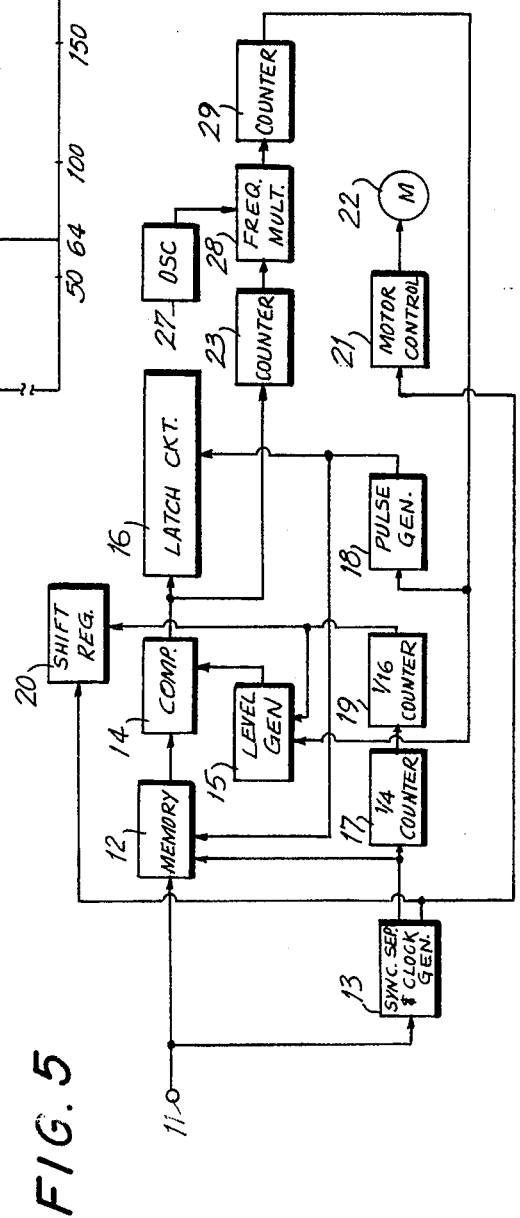
FIG. 5

METHOD AND APPARATUS FOR CONTROLLING A PRINTER

BACKGROUND OF THE INVENTION

This invention relates to a method and apparatus for controlling a printer and, more particularly, to such a method and apparatus for insuring that an indicium of uniform intensity is printed by a respective print head in response to data representing a predetermined data level regardless of the number of print heads included in the printer which are energized concurrently.

In a so-called line printer, a linear array of print heads is provided, each being selectively energized to print, or record, an indicium. Such print heads may be thermal print heads, wherein an indicium, or mark, is produced in response to thermal energy generated by that print head. As an alternative, the print heads may be photographic-type, wherein a mark is produced in response to light energy generated thereby. In both types of print heads, the intensity, or "blackness" of the mark, is a function of the duration that the print head is energized. For example, a darker mark is produced by a thermal print head when that head is energized for a longer period of time.

In the aforementioned line printer formed of a linear array of thermal print heads, data representing the intensity, or darkness of the mark to be produced by each print head is represented by a respective signal. Each such signal may be a digital signal, wherein the value of that digital signal represents the level of intensity of the mark which is to be printed. For example, data formed of a 4-bit digital signal is capable of representing any one of sixteen different intensity levels. The data signal [0000] may represent the lightest mark to be printed, and the data signal [1111] may represent the darkest mark to be printed. Thus, a print head which is energized in response to the data signal [0000] is energized for the least duration; and the print head which is energized in response to the data signal [1111] is energized for the maximum duration.

A a result of the selective energization of the line of print heads, a corresponding line of optically viewable information is printed. This information may be in the form of alphanumeric characters, a graphical representation, or a picture representing a scene, or other information. After one complete line of indicia, or marks, is printed, the recording medium, which may be conventional paper, specially treated paper, thermally responsive paper, photographically responsive film, or the like, is advanced so that the next-following line may be printed. Hence, successive lines of marks, or "dots", of differing intensity, result in the formation of a viewable image having perceptible contrasts.

A typical line printer is provided with groups of print heads, each group being formed of a number (e.g. 64) of print heads. As a numerical example, twenty groups, each consisting of 64 print heads, may be provided, resulting in a line printer formed of 1,280 print heads. For convenience, such a line printer is supplied with groups of data signals, each group serving to selectively energize a corresponding group of print heads. Consistent with the foregoing numerical example, in a line printer formed of twenty groups of print heads, twenty groups of data signals are supplied, each group being formed of 64 data signals. After the first group of print heads is energized in response to a corresponding group of data signals, the next group of print heads is energized, and so on, until the entire line of marks, or indicia, is printed.

However, it has been found that the energy which is supplied to each print head in a group of print heads varies as a function of the total number of print heads which are to be energized. That is, when thermal print heads are used, the current flowing through a particular one of such thermal print heads is less when all of the print heads in that group are energized concurrently than if that particular print head is the only one in the group which is energized. Consequently, with the same data signal used to energize that print head, a mark of lesser intensity is formed thereby when all of the print heads in the group are energized than when only that print head in the group is energized. Typically, more print heads in a group will be energized to represent lighter marks; and a lesser number of print heads will be energized to form marks of higher intensity levels. This means that, when the concentration of printed marks should be reduced, as when the intensity levels of the printed marks are high, the printed marks actually will be darker than expected because higher currents flow through the energized print heads when a smaller number of such heads is energized. As a result of this higher concentration of smaller numbers of marks, the resultant picture quality is perceived as being unnatural.

OBJECTS OF THE INVENTION

Therefore, it is an object of the present invention to provide a method and apparatus for controlling a printer of the aforementioned type such that marks, or indicia, of uniform intensity are produced regardless of the number of print heads which are energized concurrently.

Another object of this invention is to provide a method and apparatus for controlling a printer of the aforementioned type such that, when a particular print head is energized in response to a data signal representing a predetermined intensity level, the intensity of the mark generated by that print head is the same regardless of whether a large or small number of print heads is energized concurrently.

A further object of this invention is to provide a method and apparatus for controlling a printer of the aforementioned type so as to produce pictures having desirable quality and naturalness.

An additional object of this invention is to provide a method and apparatus for controlling a printer of the aforementioned type wherein the intensity of indicia printed thereby is determined by the duration over which the respective print heads are energized, and wherein the duration that such print heads are energized is varied as a function of the number of print heads which are energized concurrently.

Various other objects, advantages and features of the present invention will become readily apparent fron the ensuing detailed description, and the novel features will be particularly pointed out in the appended claims.

SUMMARY OF THE INVENTION

In accordance with this invention, a method and apparatus are provided for controlling a printer of the type having plural print heads, each head being selectively energizable to print an indicium whose relative intensity is determined by the duration of energization of that print head. Data signals representing the intensity of the indicia to be printed by the print heads are received and stored. Respective ones of the print heads are selectively energized over time durations determined by the corresponding data signals. The number of print heads which are energized is detected; and the duration that these heads are energized is varied as a function of that number. Preferably, the print heads are energized for longer durations when a greater number of them are energized concurrently.

In one aspect of this invention, successive, progressively increasing intensity level signals are generated, each such signal representing a respective intensity of an indicium to be printed. The data signal which is stored for each print head is compared to the intensity level signal which then is being generated, and if the data signal exceeds the intensity level signal, an energizing signal is produced. Only those print heads for which energizing signals have been produced are energized, and the energization of those print heads is maintained for as long as their corresponding data signals exceed the successive, progressively increasing intensity level signals.

In one embodiment of the present invention, the duration that the respective print heads are energized is varied by generating pulses of a substantially constant repetition rate, counting the number of such generated pulses, producing a timing pulse when the counted pulses correspond to the number of print heads which are energized concurrently, and using the duration between such timing pulses to establish the duration over which the print heads are energized. In another embodiment of this invention, the duration over which the print heads are energized is varied by increasing the repetition rate of the aforementioned generated pulses as a function of the number of print heads for which energizing signals are produced when a respective intensity level signal is produced, counting the pulses of increased repetition rate to produce a timing pulse each time a predetermined count is reached, and using the duration between such timing pulses to establish the duration over which the print heads are energized.

BRIEF DESCRIPTION OF THE DRAWINGS

The following detailed description, given by way of example, will best be understood in conjunction with the accompanying drawings in which:

FIGS. 3A–3C are timing diagrams which are useful in understanding the operation of the embodiment shown in FIG. 2;

FIG. 4 is a graphical representation of the change in energy supplied to a respective print head as a function of the number of print heads which are energized concurrently; and FIG. 5 is a block diagram of another embodiment of the present invention.

DETAILED DESCRIPTION OF CERTAIN PREFERRED EMBODIMENTS

Figure 1:
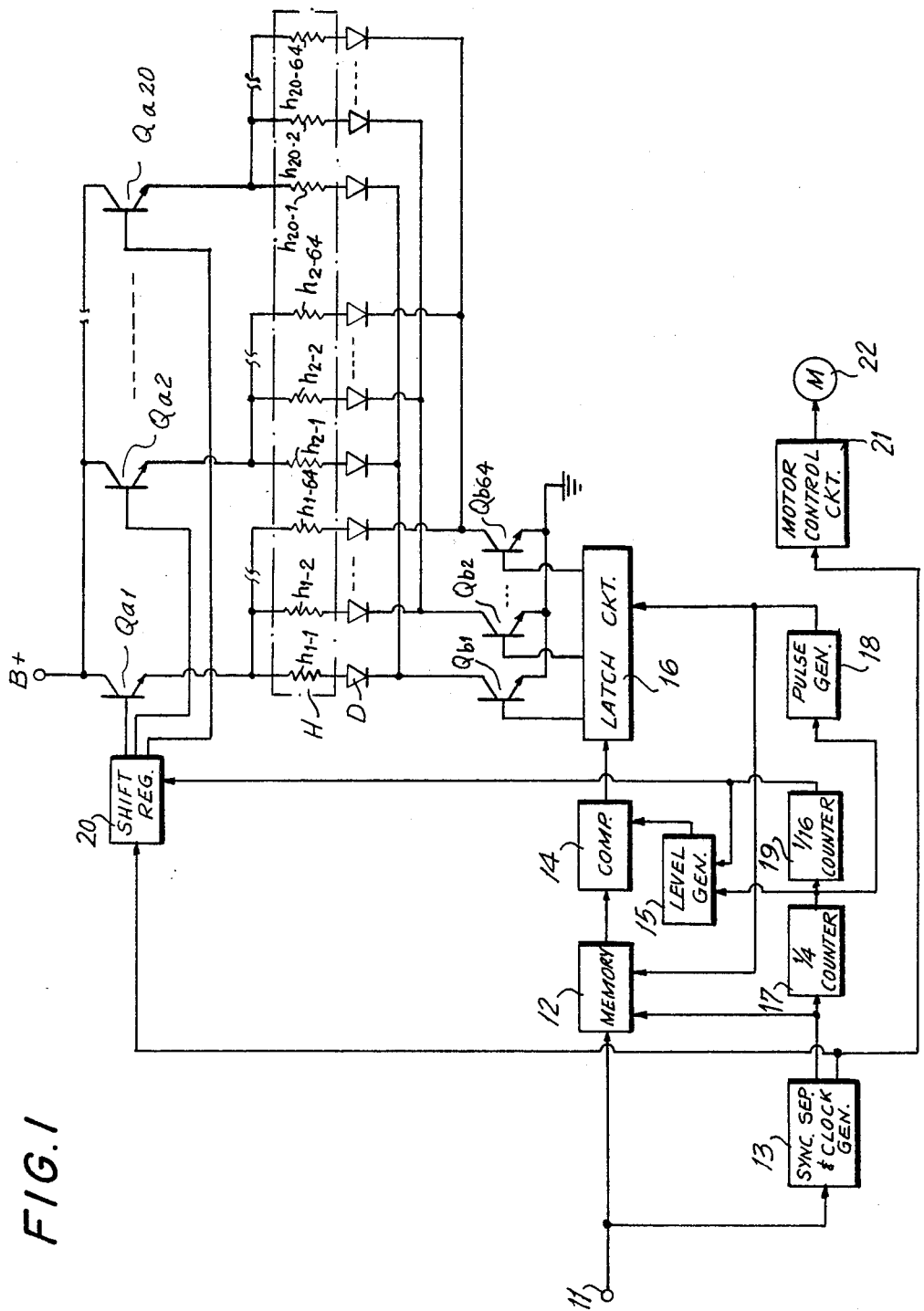
FIG. 1 is a partial block, partial schematic diagram of one embodiment of a printer with which the present invention can be used.

Referring now to the drawings, wherein like reference numerals are used throughout, FIG. 1 is one example of a printer with which the present invention finds ready application. To simplify the discussion of this printer, it is illustrated herein as a thermal printer formed of an array of thermal print heads H. These print heads preferably are aligned in a line, such that the printer functions as a line printer to print successive lines of indicia, the overall effect of such lines thus being perceived as alphanumeric characters, graphical depictions, or a picture. It will be appreciated that, alternatively, thermal print heads H may be replaced by, for example, photographic print heads.

The printer illustrated in FIG. 1 is further comprised of a storage device, such as memory 12, an intensity level signal generator 15, a comparator 14, a latch circuit 16, a shift register 20, group-selecting switching transistors $Q_{a1}, Q_{a2}, \ldots Q_{a20}$, print head driving transistors $Q_{b1}, Q_{b2}, \ldots Q_{b64}$, and a record medium drive motor 22. Memory 12 is coupled to an input terminal 11 and is adapted to be supplied with successive data signals, each data signal representing the intensity of the indicium to be printed by a corresponding one of print heads H. In the illustrated printer, print heads H are formed of m groups, each group consisting of n print heads. As a numerical example, $m=20$ and $n=64$. Memory 12 may be adapted to store the data signals representing the intensities of the indicia which are selectively printed by each print head included in a single group. Hence, successive groups of data signals are supplied to input terminal 11, each group being supplied to and stored in memory 12 so as to control the selective energization of the respective print heads included in that group. After one group of data signals is stored in memory 12, the next-following group of data signals is stored therein, and so on, until twenty successive groups of data signals are received and stored. It will be appreciated that the capacity of memory 12 may be sufficient merely to store one complete group of data signals, this group being replaced by the next-following group.

The output of memory 12 is coupled to one set of inputs of comparator 14, this comparator including another set of inputs coupled to the output of intensity level signal generator 15. The intensity level signal generator is adapted to generate successive intensity level signals, each such signal representing a predetermined intensity level. For example, if the data signals that are used to control the selective energization of print heads H are formed of 4-bit signals, each such data signal thus is representative of one out of a possible sixteen different levels of intensity. Intensity level signal generator 15 is adapted to generate each of these sixteen possible intensity levels in succession. Thus, the lowest intensity level signal first is generated, as may be represented by [0000], followed by the next-higher intensity level signal, which may be represented as [0001], followed by the next-higher intensity level signal, and so on, until the signal representing the greatest intensity level, such as [1111] is generated. These successively generated, progressively increasing intensity level signals are supplied to comparator 14. Likewise, each of the data signals stored in memory 12, and thus included in a respective one group of data signals, is supplied to comparator 14. The data signals may be supplied in seriatum, or alternatively, all of the data signals may be supplied in parallel. In either embodiment, comparator 14 is adapted to compare the intensity level represented by the data signals stored in memory 12 to the intensity level represented by the signal then being generated by intensity level signal generator 15. If the intensity represented by the data signal exceeds the intensity represented by the intensity level of the signal then generated by generator 15, comparator 14 produces an energizing signal. As illustrated, comparator 14 is coupled to latch circuit 16 so as to supply the generated energizing signals thereto.

Latch circuit 16 may be of conventional construction and, for example, may include n separate storage compartments, each storage compartment being associated with a respective print head in a group of print heads. For the numerical example discussed hereinabove, wherein it has been assumed that each group of print heads is comprised of 64 separate print heads, latch circuit 16 likewise may include 64 separate storage compartments. Each storage compartment is adapted to store an energizing signal produced by comparator 14. Thus, if the data signal which represents the intensity of the indicium to be produced by the first print head of a group, such as an indicium to be produced by print head $h_{1-1}$, exceeds the intensity level signal when generated by generator 15, the energizing signal produced by comparator 14 is stored in the first storage compartment of latch circuit 16. Likewise, if the data signal which determines the intensity of the indicium that is to be produced by the second print head, such as by print head $h_{1-2}$, exceeds the level of the intensity level signal then generated by generator 15, the energizing signal produced by comparator 14 is stored in the second storage location of latch circuit 16. In this manner, each storage compartment of the latch circuit stores an energizing signal representing that the corresponding print heads $h_{1-1}$, $h_{1-2}$, ... $h_{1-64}$ are to be energized. However, if the data signal which represents the intensity of the indicium to be produced by, for example, print head $h_{1-f}$ is less than the intensity level signal then generated by generator 15, comparator 14 produces a de-energizing signal which is stored in the f-th storage compartment of latch circuit 16.

It is appreciated that, if a storage compartment of latch circuit 16 stores an energizing signal, a corresponding one of transistors $Q_{b1}$–$Q_{b64}$ whose base electrode is coupled thereto is rendered conductive so as to permit current to flow through the corresponding print head $h_{1-1}$–$h_{1-64}$.

FIG. 1 also illustrates timing control circuitry which is used to control memory 12, intensity level signal generator 15, latch circuit 16 and shift register 20. This timing circuitry is comprised of a synchronizing signal separator and clock generator 13, a count-to-4 counter 17, a count-to-16 counter 19 and a pulse generator 18. Synchronizing signal separator and clock generator 13 is coupled to input terminal 11 to separate the line synchronizing signal which normally accompanies the data signals. The separated synchronizing signal is used to synchronize the clock generator included in synchronizing signal separator and clock generator 13 and also is supplied to shift register 20 and to a motor control circuit 21. These synchronizing signals are used as reset signals to reset shift register 20 in a manner to be described, and also to synchronize the operation of motor control circuit 21 so as to drive record medium drive motor 12 as to advance the record medium a sufficient amount to have the next-following line of indicia recorded thereon.

Synchronizing signal separator and clock generator 13 also includes a clock output terminal for supplying clock signals of a substantially higher repetition rate, these clock signals being synchronized with the separated line synchronizing signal. Such higher frequency clock signals are supplied to memory 12 and to count-to-4 counter 17 which, as illustrated, is connected in cascade with count-to-16 counter 19 so as to form, in combination, a count-to-64 counter. It will be appreciated that, in accordance with the aforedescribed numerical example, after 64 successive data signals are stored in memory 12, an output pulse is generated by count-to-16 counter 19. This output pulse is supplied as a reset pulse to intensity signal level generator 15, thereby resetting this generator so as to generate the intensity level signal representing, for example, the minimum intensity [0000]. The output pulse generated by count-to-16 counter 19 also is coupled to shift register 20 so as to shift the contents of this shift register from one stage to the next-following stage for a purpose soon to be described.

As shown in FIG. 1, the output of count-to-4 counter 17 also is coupled to intensity level signal generator 15 and to pulse generator 18. The output of counter 17 is utilized by intensity signal level generator 15 to increment the intensity-representing signal generated thereby. Thus, in response to each output pulse generated by counter 17, the intensity level signal generated by generator 15 may be incremented from, for example, [0000] to [0001] and then to [0010], and so on, thus incrementing, or stepping, the intensity level signal from one level to the next, successively. It will be appreciated that, when the generated intensity level signal is incremented to its highest level, such as [1111], count-to-16 counter 19 will generate the aforementioned reset pulse so as to reset generator 15 to its initial, lowest intensity level.

Pulse generator 18 is responsive to each timing pulse supplied thereto from the output of count-to-4 counter 17 to generate high frequency clock pulses. As illustrated, these high frequency clock pulses are supplied to memory 12 and also to latch circuit 16. The high frequency clock pulses generated by pulse generator 18 function as read-out pulses so as to non-destructively read out each of the data signals then stored in memory 12. In accordance with the aforementioned numerical example, the 64 data signals stored in memory 12 are read out therefrom successively. It is appreciated that each data signal that is read out from memory 12 is compared, in comparator 14, to the intensity level signal signal then generated by generator 15. Consequently, comparator 14 generates 64 successive signals, some of which will be energizing signals and others will be de-energizing signals, depending upon whether the data signals supplied thereto exceed the intensity level signal then being generated by generator 15.

The high frequency clock pulses supplied to latch circuit 16 serve to enable the storage compartments therein to receive the energizing and de-energizing signals then being produced by comparator 14. In this manner, an energizing signal stored in a particular storage compartment of latch circuit 16 either will be maintained or will be terminated. If the data signal which represents the intensity of the indicium to be printed by a corresponding print head exceeds the intensity level signal then generated by generator 15, the energizing signal then stored in the corresponding storage compartment of latch circuit 16 will be maintained. However, if the data signal which determines the intensity of the indicium produced by that print head now is less than the generated intensity level signal, the energizing signal stored in the corresponding storage compartment of latch circuit 16 will be changed over to a de-energizing signal. This, in turn, terminates the energization of the corresponding print head.

As mentioned above, memory 12 preferably exhibits a capacity which is sufficient to store the data signals associated with one group of print heads. Shift register 20 is adapted to select the appropriate group of print heads which then are selectively energized or de-energized, depending upon whether the contents of the corresponding storage compartments of latch circuit 16 have energizing or de-energizing signals stored therein. Shift register 20 is shifted to the next-following stage thereof when the next-following group of data signals is supplied to memory 12. Thus, when the first group of data signals is received by the memory, the first stage of shift register 20 is actuated, thereby rendering transistor $Q_{a1}$ conductive. This, in turn, selects print heads $h_{1-1}$–$h_{1-64}$ in the first group of print heads for energization. After these print heads are energized, in the manner described below, the next-following group of data signals is supplied to memory 12. Count-to-16 counter 19 then supplies a shift pulse to shift register 20 so as to deactuate the first stage and now actuate the second stage thereof. Consequently, transistor $Q_{a2}$ is actuated to select the second group of print heads, consisting of print heads $h_{2-1}$–$h_{2-64}$, for energization. It is appreciated, therefore, that as each successive group of data signals is supplied to memory 12, count-to-16 counter 19 produces a shift pulse to shift the actuation of shift register 20 to the next-following stage, thereby enabling the next-following group of print heads to be selected. It is recognized, therefore, that transistors $Q_{a1}$–$Q_{a20}$ and transistors $Q_{b1}$–$Q_{b64}$ cooperate to energize corresponding print heads in successive groups. After the last group of print heads $h_{20-1}$–$h_{20-64}$ is energized, a complete line of indicia will be printed; and shift register 20 then is reset to actuate its initial stage. This resetting is carried out by synchronizing signal separator and clock generator 13; which also generates a motor advance signal, whereby motor control circuit 21 drives record medium drive motor 22 to advance the record medium by an amount sufficient to enable the next line of indicia to be printed thereon.

The manner in which the embodiment illustrated in FIG. 1 operates to print a line of indicia now will be described in greater detail. Let it be assumed that the first group of data signals in a line is supplied to and stored in memory 12. The first stage of shift register 20 will be actuated, thus rendering transistor $Q_{a1}$ conductive so as to select the first group of print heads $h_{1-1}$–$h_{1-64}$. After this group of data signals is stored in memory 12, the data signals are compared, successively, to the intensity level signal then generated by generator 15. Let it be assumed that the intensity level signal then generated represents the lowest intensity, such as [0000]. The data signal which is used to control print head $h_{1-1}$ is compared to this generated intensity level signal, and if the data signal exceeds the generated level, comparator 14 supplies an energizing signal to be stored in the first stage of latch circuit 16. Then, the second data signal stored in memory 12 is read out therefrom and compared to this same generated intensity level signal. If the intensity level represented by this second data signal exceeds the generated intensity level signal, comparator 14 supplies an energizing signal which is stored in the second storage compartment of latch circuit 16. The foregoing operation continues until all of the 64 data signals stored in memory 12 are read out therefrom and compared to this lowest intensity level signal. It is expected that some of the data signals read out from memory 12 will represent the lowest intensity level and, therefore, the corresponding storage compartment of latch circuit 16 will storage a deenergizing signal therein.

After all 64 data signals have been read out from memory 12, count-to-4 counter 17 increments intensity level signal generator 15 to generate a signal representing the next-higher intensity level, for example, [0001]. Then, the foregoing comparison operation is repeated, whereby each of the 64 data signals stored in memory 12 are compared, one-by-one, to this next-higher intensity level signal. Depending upon the intensity levels represented by such data signals, comparator 14 will supply either energizing or deenergizing signals to be stored in the corresponding storage compartments of latch circuit 16. Then, after all 64 data signals have been compared to this generated intensity level signal, the next-higher intensity level signal is generated, for example, [0010]. The foregoing operation then is repeated; and thereafter, the next-higher intensity level signal is generated. Thus, it is seen that each of the 64 data signals stored in memory 12 is compared to each of the 16 intensity level signals that are generated, successively, by generator 15.

When an energizing signal is stored in a particular storage compartment of latch circuit 16, the transistor $Q_{b1}$ . . . $Q_{b64}$ connected to that storage compartment is rendered conductive. However, when the energizing signal stored in that storage compartment of latch circuit 16 changes over to a deenergizing signal, the transistor is rendered non-conductive. Consequently, each transistor is rendered conductive for a duration that is a direct function of the intensity level represented by the corresponding data signal. The data signal [0000] renders the corresponding transistor non-conductive throughout the entire sixteen levels of comparison. The data signal [0001] renders the transistor conductive for 1/16th of the comparison duration. The data signal [0010] renders the transistor conductive for 2/16ths of the comparison duration. Thus, it is appreciated that the data signal [1001] renders the transistor conductive for 9/16ths of the comparison duration; and the data signal [1111] renders the transistor conductive for the entire comparison duration. It is recognized that the transistors are rendered conductive, selectively, while the comparison operation is carried out. As the level represented by the generated intensity level increases, it is expected that fewer of the transistors remain conductive, until very few, or none, of the transistors conducts when the maximum intensity level signal is generated.

Current flows through a respective print head $h_{1-1}$ . . . $h_{1-64}$ for so long as its corresponding transistor $Q_{b1}$ . . . $Q_{b64}$ remains conductive. Thus, the intensity of the indicium which is produced by a respective print head is a function of the current flowing through that print head multiplied by the time duration that this current flows therethrough.

In the embodiment of FIG. 1, diodes D are connected in series with each of the print heads for the purpose of preventing current from flowing in the opposite direction, as when head $h_{1-1}$ is deenergized but head $h_{2-1}$ is energized.

It now will be shown that the magnitude of current which flows through a particular print head varies as a function of the number of print heads which are energized concurrently. It is appreciated, from the foregoing explanation, that the number of print heads which are energized concurrently depends upon whether the data signals associated with such print heads exceed the intensity level signal then generated by generator 15. It is recalled that, for lower level intensity level signals, a greater number of print heads are expected to be energized concurrently. However, when the intensity level signal increases to higher levels, it is expected that a lesser number of print heads will be energized at the same time.

Let is be assumed that the voltage supplied to power supply terminal B+ is equal to V. Let it be further assumed that the impedance of the line from power supply terminal B+ to a group of print heads is equal to R. Finally, let it be assumed that the resistance of each print head h is equal to r. Now, if n print heads are energized ($1 < n < 64$), then the total current $I_n$ flowing through this group of print heads may be represented as:

$$I_n = \frac{V}{\frac{r}{n} + R} \tag{1}$$

For example, if the first group of print heads is energized, then this current $I_n$ may be assumed to flow through transistor $Q_{a1}$. The current $i_n$ flowing through a respective one of the energized print heads in this group is $1/n$ of the total current $I_n$ and may be represented as:

$$i_n = \frac{I_n}{n} = \frac{V}{r + nR} \tag{2}$$

Now, if only one print head is energized, such as when the generated intensity level signal represents a relatively high level, $n=1$, and the current $i_1$ flowing through that single energized print head may be represented as:

$$i_1 = \frac{V}{r + R} \tag{3}$$

However, from equation (2), it is seen that when all of the 64 print heads included in the group are energized concurrently, such as when the generated intensity level signal represents a very low intensity, then the current $i_{64}$ flowing through the same one print head may be represented as:

$$i_{64} = \frac{V}{r + 64R} \tag{4}$$

It is recognized that, if the print heads are thermal print heads, then the energy $W_n$ which is supplied to a respective one head is thermal energy and may be represented as:

$$W_n = i_n^2 \cdot r \tag{5}$$

Now, when equations (3) and (4) are substituted into equation (5), the energy supplied to a particular print head when only one print head in the group is energized may be represented as $W_1$, and the energy which is supplied to that very same print head when all of the print heads of the group are energized may be represented as $W_{64}$. Equation (5) thus may be rewritten as $$W_1 = (i_1)^2 \cdot r = \left(\frac{V}{r + R}\right)^2 \cdot r \tag{6}$$

$$W_{64} = i_{64}^2 \cdot r = \left(\frac{V}{r + 64R}\right)^2 \cdot r \tag{7}$$

Now, as numerical examples, let is be assumed that the resistance r of a typical thermal print head is 170 Ω, and the line impedance R is 0.2 Ω. Then, the ratio between the energy supplied to a particular print head when all of the print heads in the group are energized to the energy supplied to that same print head if it is the only print head in the group which is energized may be approximated to be:

$$\frac{W_{64}}{W_1} \approx 0.87 \tag{8}$$

From the foregoing, and particularly equation (8), it is recognized that the energy which is supplied to a particular print head varies as a function of the number of print heads which are energized concurrently. Consequently, the intensity of the indicium produced by that print head varies as a function of the number of print heads which are energized. This means that, for the same data signal, the indicium produced in response thereto will be darker, or of greater intensity, when a lesser number of print heads are energized concurrently than when a greater number of print heads are so energized. That is, even though the same data signal is used to control the energization of a print head, the indicium produced in response thereto is not uniform. As a consequence of this non-uniformity in the energy supplied to the print head, the overall quality of the "picture" which is printed will be perceived to be quite unnatural.

The foregoing deficiency in the quality of the printed picture due to the number of print heads which are energized concurrently during each comparison operation, is overcome by the present invention. The intensity, or darkness, of an indicium printed by a print head is a function of the product of the thermal energy W supplied to that print head and the duration T during which that print head is energized. Thus, to produce indicia of uniform intensity regardless of the number of print heads which are energized concurrently, the product of the supplied energy and duration of energization $W_N T_N$ when all of the print heads are energized (N=64) should be equal to the product of the supplied energy and duration of energization $W_n T_n$ when any number n of print heads are energized concurrently (n=1, 2, 3, ... 64). Thus, $$W_N T_N = W_n T_n \tag{9}$$

Now, let it be assumed that the duration $T_N$ is defined by N pulses having the period, or wave length λ. The duration $T_n$ thus is defined by n of these same pulses. From equations (6) to (8), it is recognized that a lesser amount of energy is supplied to a particular print head when a greater number of print heads are energized concurrently. Therefore, to implement equation (9), the duration $T_N$ must be greater than the duration $T_n$. This means that N>n. The difference between durations $T_N$ and $T_n$ may be expressed as:

$$T_N - T_n = (N - n) \times \lambda \tag{10}$$

-continued
$$\lambda = \frac{T_N - T_n}{N - n}$$

In accordance with the present invention, the timing pulses which are supplied to memory 12 and to latch circuit 16 by pulse generator 18, as well as the timing pulses which are supplied to intensity level signal generator 15 to increment that generator so as to generate the next-higher intensity level signal, are controlled so as to exhibit the variable period $\lambda$ in accordance with equation (10). That is, $\lambda$ is varied directly with n. As the number of print heads which are energized concurrently increases, the periodicity of the aforementioned timing pulses likewise increases. Conversely, as the number of print heads which are energized concurrently decreases, the periodicity of the timing pulses also decreases. Thus, the duration of energization of the print heads varies directly with the number of concurrently energized print heads.

Figure 2:
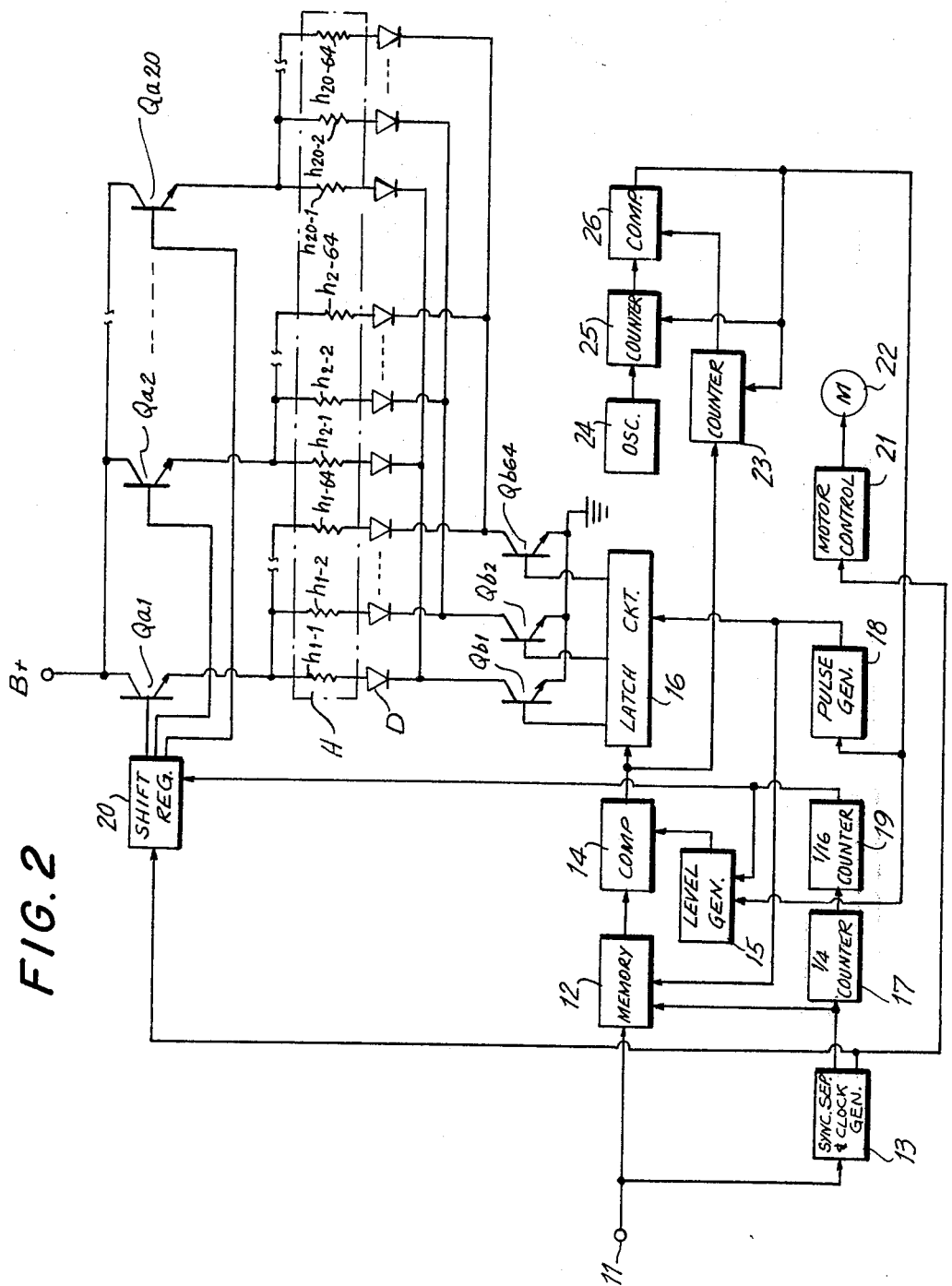
FIG. 2 is a block diagram of one embodiment of the present invention as used with such a printer.

One embodiment by which the present invention is carried out is illustrated in FIG. 2. It is recognized that the circuitry used to read the data signals out of memory 12, to compare those data signals to successively generated, progressively increasing intensity level signals, and to store energizing signals in latch circuit 16, is quite similar to the corresponding circuitry discussed hereinabove with respect to FIG. 1. Accordingly, in the interest of brevity, only the differences between the apparatus shown in FIGS. 1 and 2 will be described.

FIG. 2 includes additional circuitry comprised of a stable oscillator 24, counters 23 and 25 and a comparator 26, for the purpose of varying the periodicity of the timing pulses supplied to memory 12, intensity level signal generator 15 and latch circuit 16 as a function of the number of print heads which are energized concurrently. Oscillator 24, which may comprise a conventional, stable, crystal oscillator, generates pulses of constant repetition rate, these pulses being supplied to and counted by counter 25. Counter 23 is coupled to the output of comparator 14 and counts each energizing signal that is generated by the comparator and supplied to latch circuit 16. Thus, it is appreciated that counter 23 functions to count the number of print heads which will be energized concurrently. Counters 23 and 25 are coupled to comparator 26 which is adapted to sense when the counts supplied thereto are equal so as to produce an output timing pulse. The output of comparator 26 is coupled to intensity level signal generator 15 and to pulse generator 18.

The operation of this timing pulse control circuitry now will be described in conjunction with the timing diagrams shown in FIGS. 3A–3C. The pulses generated by oscillator 24 are illustrated in FIG. 3B. FIG. 3A represents those energizing signals which are produced by comparator 14 when the intensity levels represented by respective data signals read out of memory 12 exceed the intensity level signal which then is being generated by generator 15. It is recognized that memory 12 is read out at a much faster rate than the repetition rate of the pulses shown in FIG. 3B.

Let it be assumed that the particular intensity level signal which is generated by generator 15 is exceeded by ten data signals read out of memory 12. Hence, and as shown in FIG. 3A, counter 23 is incremented in response to each energizing signal produced by comparator 14 so as to attain the count of 10. Counter 25 will be incremented to a count of 10 after oscillator 24 generates 10 of the pulses shown in FIG. 3B. At that time, comparator 26 produces an output timing pulse, as shown in FIG. 3C. It is seen that the duration between the first two pulses shown in FIG. 3C is equal to 10$\lambda$, wherein $\lambda$ is the period of the pulses generated by oscillator 24. Hence, when 10 print heads are energized concurrently, they remain energized for a duration approximately equal to 10$\lambda$.

The timing pulse produced by comparator 26 increments intensity level signal generator 15 to generate the next-higher intensity level signal. This timing pulse also is supplied to pulse generator 18 which, in turn, supplies high frequency read clock signals to memory 12 and to latch circuit 16. It is recalled that, in response to each of these read clock signals, a respective data signal is read out of memory 12; and the energizing/deenergizing signal produced by comparator 14 in response thereto is shifted into latch circuit 16.

Let it now be assumed that, in response to this next-higher intensity level signal which is generated by generator 15, seven data signals are detected by comparator 14 to exceed this intensity level signal. Hence, seven energizing signals will be shifted into the appropriate storage compartments of latch circuit 16, as illustrated in FIG. 3A. This means, of course, that 7 print heads are to be energized concurrently. Counter 23 thus is incremented to the count of 7; and when 7 pulses (FIG. 3B) are generated by oscillator 24, counter 25 also will be incremented to a count of 7. Comparator 26 thus produces the next-following output timing pulse shown in FIG. 3C, this timing pulse being delayed from the preceding timing pulse by the duration 7$\lambda$. Thus, the seven print heads which remain energized in response to the aforementioned comparison operation remain energized for a duration approximately equal to 7$\lambda$.

The timing pulse produced by comparator 26 serves to increment generator 15 to produce the next-higher intensity level signal; and also is used to trigger pulse generator 18 so as to read the contents of memory 12 once again, thereby initiating another comparison operation. As before, counter 23 is incremented to count the number of energizing signals which are supplied to latch circuit 16, thus representing the number of print heads which are to be energized concurrently. In this example, it now is assumed that five print heads are to be energized concurrently. Accordingly, after oscillator 24 generates five pulses, as shown in FIG. 3B, comparator 26 produces another output timing pulse, this one being delayed from its preceding timing pulse by the duration 5$\lambda$.

From the foregoing description, it is seen that, depending upon the number of print heads which are to be energized concurrently, the duration of energization is varied directly. Hence, even though the energy supplied to a particular print head is greater if the total number of concurrently energized print heads is small, the duration of energization of that print head will be reduced such that the overall energy WT remains constant, regardless of the number of concurrently energized print heads. Of course, if the total number of print heads which are to be energized concurrently is large, thus resulting in a lesser amount of energy supplied to each print head, the duration of energization thereof is increased such that the total energy supplied to that print head remains constant.

From FIGS. 3A and 3B, it is appreciated that the rate at which data signals are read out of memory 12 and the rate at which energizing signals are shifted into latch circuit 16 is much greater than the pulse repetition rate of oscillator 24. As a numerical example, if equation (9) is substituted into equation (10), the period $\lambda$ of the pulses generated by oscillator 24 may be expressed as:

$$\lambda = \frac{T_N}{N-n}\left(1 - \frac{W_N}{W_n}\right) \tag{11}$$

Typically, the maximum duration of energization $T_N$ may be 0.1 msec. Since $N=64$, $n=1$, $r=170\Omega$, $R=0.2\Omega$, equation (11) may be approximated if $\lambda=0.2$ usec. resulting in a pulse repetition rate $f=5$ MHz.

FIG. 4 is a graphical representation of the ratio between the energy $w_1$ supplied to a particular print head when only that print head is energized, and the energy $w_n$ supplied to that same print head when n print heads are energized, for varying line impedances R. For the example described hereinabove, wherein $R=0.2\Omega$ and $n=64$, this ratio is seen to be approximately 1.15. FIG. 4 illustrates that, as the line impedance increases and/or as the number n of concurrently energized print heads increases, the ratio $w_1/w_n$ also increases. Since the curves of FIG. 4 are substantially linear from $n=0-64$, the embodiment shown in FIG. 2 to varying the duration of energization of the timing pulses is a very good approximation of obtaining uniform indicia in response to a particular data signal, regardless of the number of print heads which are energized concurrently.

Another embodiment of the present invention is illustrated in FIG. 5. In order to simplify this drawing, print heads H, diodes D, block-selecting transistors $Q_a$ and print head energizing transistors $Q_b$ are omitted. The circuitry shown in FIG. 5 is substantially similar to that shown in FIG. 2, except that in the presently described embodiment, the circuit for controlling the duration of energization now is comprised of an oscillator 27, a frequency multiplier 28 and a counter 29. Oscillator 27 may be comprised of a crystal oscillator for generating pulses of a stable repetition rate. These pulses are supplied to frequency multiplier 28. Counter 23, which is similar to counter 23 shown in FIG. 2, also is coupled to multiplier 28 and serves to establish a multiplying factor as a function of the count attained thereby. This multiplying factor is inversely related to the count such that, if the count of counter 23 is higher, the multiplying factor is correspondingly lower. The output of multiplier 28, which is a frequency-multiplied pulse signal, is supplied to counter 29 which generates an output timing pulse upon reaching a predetermined count.

In operation, if comparator 14 produces, for example, ten energizing signals, such as shown in FIG. 3A, the frequency of the pulses generated by oscillator 27 is multiplied in multiplier 28, by a predetermined factor a. Thus, the frequency of the pulses supplied to counter 29 by multiplier 28 may be equal to, for example, af. When counter 29 reaches its predetermined count, an output timing pulse is supplied thereby to intensity level signal generator 15 and to pulse generator 18, resulting in the same effect as the timing pulse supplied to these elements by comparator 26 of FIG. 2.

If comparator 14 produces seven energizing signals, multiplier 28 multiplies the frequency f of the pulses generated by oscillator 27 by, for example, the factor b, wherein $b>a$. Since the frequency bf of the pulses supplied to counter 29 now is greater than the frequency af of the pulses previously supplied thereto, it is appreciated that the counter reaches its predetermined count within a shorter duration. Hence, the duration between the timing pulses produced by counter 29 is reduced, as shown in FIG. 3C, thereby decreasing the duration of energization of the print heads.

Similarly, if comparator 14 produces five energizing pulses (FIG. 3A), multiplier 28 multiplies the frequency f of oscillator 27 by the factor c wherein $c>b$. Counter 29 now reaches its predetermined count in a shorter interval, thereby further reducing the duration between successive timing pulses produced thereby so as to reduce the duration of energization of the print heads. Thus, it is seen that the embodiment of FIG. 5, although of alternative construction to the embodiment shown in FIG. 2, nevertheless functions in a similar manner so as to vary the duration of energization of the print heads directly with the number of print heads which are to be energized concurrently.

In the embodiments shown in FIGS. 2 and 5, the data signals stored in memory 12 are read out therefrom in sequence, each data signal being compared to the intensity level signal then generated by level generator 15, resulting in either an energizing or deenergizing signal which, in turn, is shifted into the appropriate storage compartment of latch circuit 16. Thus, these energizing-/deenergizing signals are shifted into the latch circuit in seriatum. Alternatively, all of the data signals stored in memory 12 may be compared, in parallel, to the intensity level signal then generated by generator 15, and the resulting energizing/deenergizing signals produced by comparator 14 then may be loaded, in parallel, into the appropriate storage locations of the latch circuit.

Furthermore, although memory 12 has been described as storing only one block of data signals, if desired, the memory may be provided with sufficient capacity to store an entire line of data signals. Likewise, latch circuit 16 may exhibit a sufficient number of storage compartments so as to selectively energize all of the print heads in a line, rather than merely all of the print heads in a block. In this latter embodiment, shift register 20 may be omitted. However, in order to minimize the complexity of memory 12 and latch circuit 16, it is preferred to condition the print heads on a block-by-block basis by using shift register 20 in the manner discussed above.

While the present invention has been particularly shown and described with reference to preferred embodiments, it will be readily apparent by those of ordinary skill in the art that various changes and modifications in form and details may be made without departing from the spirit and scope of the invention. For example, a greater or lesser number of intensity level signals may be generated by generator 15. The number of such levels is used to establish the number of gradations of each indicium printed by the print heads. If only a single gradation is to be printed (e.g. "black" or "white"), comparator 14 and generator 15 would be omitted.

It is intended that the appended claims be interpreted as including the foregoing as well as various other changes and modifications.

What is claimed is:

1. Apparatus for controlling a printer of the type having plural print heads each being selectively energizable to print an indicium whose relative intensity is represented by a data level and is determined by the duration of energization of that print head, such that an indicium of uniform intensity is printed by a respective print head in response to a predetermined data level regardless of the number of print heads that are energized concurrently, said apparatus comprising storage means for storing data representing the intensity of the indicia to be printed by said print heads; intensity level signal generating means for generating successive, progressively increasing intensity level signals, each signal representing a respective intensity of an indicium to be printed; read-out means for reading out at a read-out rate the data stored in said storage means; comparison means for comparing the data read out for each print head to the intensity level signal then being generated, to produce a respective energizing signal if the intensity level represented by said data exceeds the intensity represented by said generated intensity level signal; energizing means for energizing those print heads for which energizing signals have been produced and maintaining the energization of those print heads until said energizing signals terminate; detecting means for detecting the number of print heads for which energizing signals are produced when a respective intensity level signal is produced; and varying means for varying the rate at which said intensity level signals are generated and the read-out rate at which said data is read out of said storage means as a function of said detected number and thereby vary the duration that said energizing means energizes said print heads as a function of the number of print heads which are energized concurrently.

2. The apparatus of claim 1 wherein said varying means comprises pulse generating means for generating pulses of a substantially constant repetition rate; counting means for counting the number of pulses generated by said pulse generating means; comparator means for comparing the number of pulses counted by said counting means to the number of print heads detected by said detecting means and for producing a timing pulse when said compared numbers correspond; and timing means responsive to said timing pulse to determine the rate at which said intensity level signals are generated and the rate at which said data is read out of said storage means.

3. The apparatus of claim 1 wherein said varying means comprises pulse generating means for generating pulses of a substantially constant repetition rate; means for increasing the repetition rate of said generated pulses as a function of the number of print heads detected by said detecting means; counting means coupled to said means for increasing for counting said pulses having increased repetition rate and for producing a timing pulse when a predetermined count is attained; and timing means responsive to said timing pulse to determine the rate at which said intensity level signals are generated and the rate at which said data is read out of said storage means.

4. The apparatus of claim 3 wherein said means for increasing the repetition rate of said generated pulses increases said repetition rate as an inverse function of said number of print heads detected by said detecting means, whereby said repetition rate is increased by a lesser amount when a larger number of print heads are detected by said detecting means.

5. The apparatus of claim 1 further including latch means having storage compartments associated with said print heads, respectively, each storage compartment receiving an energizing signal when the data representing the intensity level of the indicia to be printed by an associated print head exceeds the intensity level then generated by said intensity level generating means and said each storage compartment receiving a de-energizing signal when said data representing the intensity level of said indicia to be printed by said associated print head is less than said intensity level then generated by said intensity level generating means; said latch means being coupled to said switch means, whereby said switch means supplies energy to said print heads for so long as energizing signals are received by respective ones of said storage compartments.

6. The apparatus of claim 5 further including pulse generating means coupled to said varying means for generating change-over pulses of varying periodicity, said change-over pulses being supplied to said latch means to enable said storage compartments to receive said selectively generated energizing and de-energizing signals.

7. The apparatus of claim 6 wherein said storage means comprises a memory circuit having plural storage locations, each associated with a respective print head and into which data representing the intensity of the indicia to be printed by said respective print head is stored and from which said data is read and compared to said generated intensity level.

8. The apparatus of claim 1 wherein said detecting means comprises count means coupled to said comparison means for counting the number of energizing signals that are generated thereby in response to a respective, generated intensity level.

9. The apparatus of claim 1 wherein said print heads are comprised of m groups of print heads, each group including n print heads (m and n are integers); wherein said storage means stores data representing the intensity of the indicia to be printed by a respective group of print heads; and wherein said energizing means selectively energizes the print heads in a respective group; and further comprising selecting means for selecting successive groups of print heads to be energized, in order, by said energizing means.

10. A method for controlling the energization of print heads to print indicia of an intensity represented by data, such that an indicium of uniform intensity is printed by a respective print head in response to a predetermined data level regardless of the number of print heads that are energized concurrently, said method comprising the steps of receiving and storing data representing the intensity of indicia to be printed by said print heads; generating successive, progressively increasing intensity level signals, each signal representing a respective intensity of an indicium to be printed; comparing the data stored for each print head to the intensity level signal then being generated, and producing a respective energizing signal if the intensity level represented by said data exceeds the intensity represented by said generated intensity level signal; energizing those print heads for which energizing signals have been produced and maintaining the energization of those print heads until said energizing signals terminate; detecting the number of print heads for which energizing signals are produced when a respective intensity level signal is produced; and varying the duration of energization of said print heads and also the rate at which said intensity level signals are generated as a function of said detected number.

11. The method of claim 10 wherein said step of varying comprises increasing the duration of energization of said print heads when a respective intensity level signal is produced, and reducing the rate at which successive intensity level signals are generated, when a larger number of print heads is energized.

12. The method of claim 10 wherein said step of varying commprises generating pulses of a substantially constant repetition rate; counting the number of generated pulses; producing a timing pulse when said counted pulses correspond to said detected number of print heads; and using said timing pulses to change said intensity level signal to the next successive level and to determine the duration over which said print heads are energized.

13. The method of claim 10 wherein said step of varying comprises generating pulses of a substantially constant repetition rate; increasing said repetition rate as a function of the number of print heads for which energizing signals are produced when a respective intensity level signal is produced; counting the pulses of increased repetition rate to produce a timing pulse each time a predetermined count is reached; and using the timing pulses to change said intensity level signal to the next successive level and to determine the duration over which said print heads are energized.

* * * * *